Figure 3:
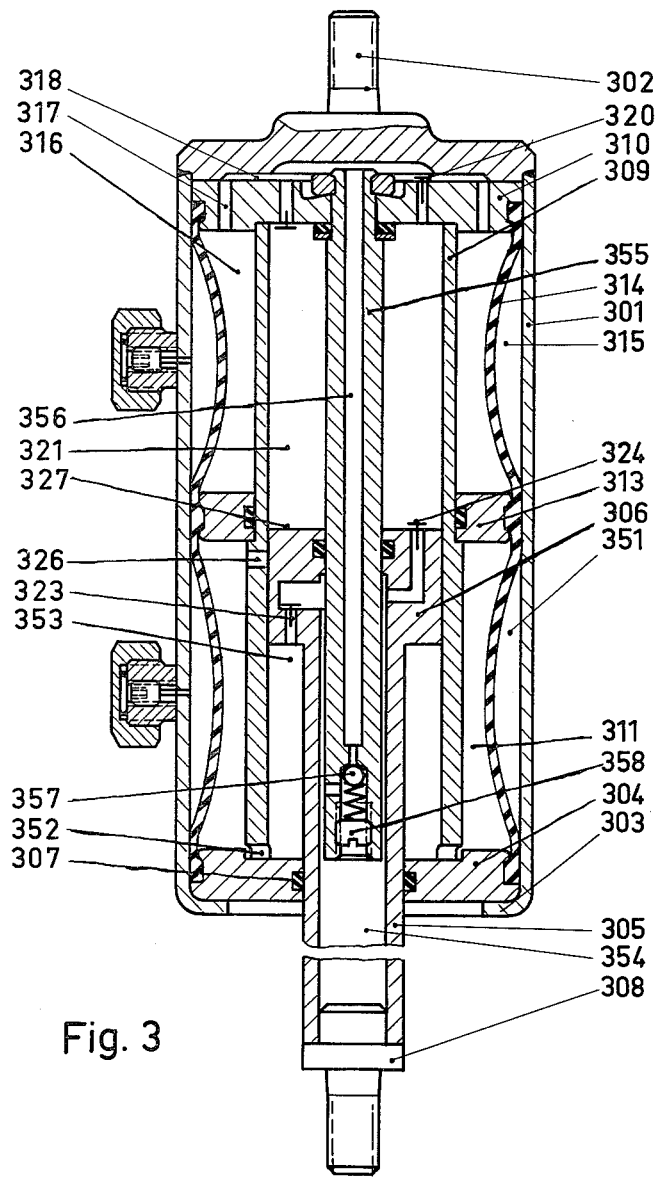

Dec. 7, 1965   F. TUCZEK   3,222,049
HYDROPNEUMATIC SUSPENSION UNIT
Filed Dec. 5, 1963   2 Sheets-Sheet 1
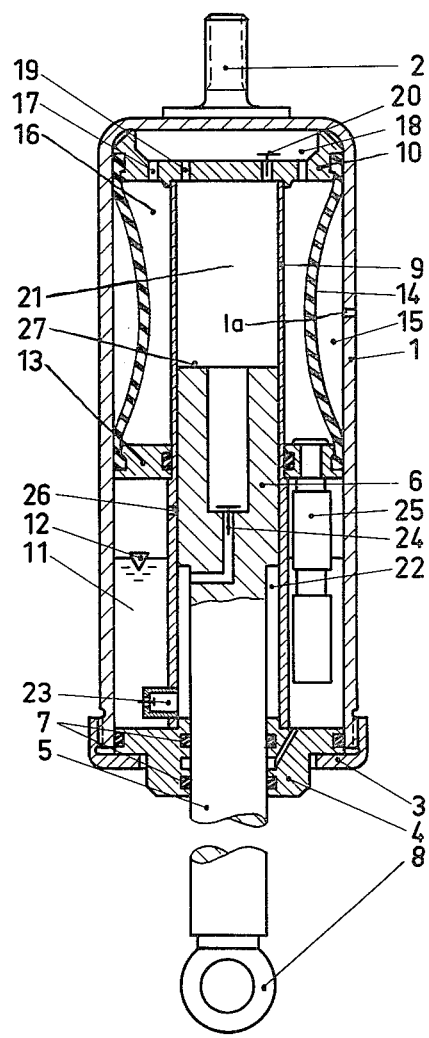

United States Patent Office 3,222,049
Patented Dec. 7, 1965

3,222,049
HYDROPNEUMATIC SUSPENSION UNIT
Franz Tuczek, Eitorf (Sieg), Germany, assignor to Boge G.m.b.H., Eitorf (Sieg), Germany, a firm of Germany
Filed Dec. 5, 1963, Ser. No. 328,341
Claims priority, application Germany, Dec. 7, 1962,
B 69,899
6 Claims. (Cl. 267—24)

The present invention relates to a self-pumping hydropneumatic suspension unit, adapted to be employed for motor vehicles, and more particularly to a part thereof provided for regulating the working pressure of the device. In suspension units of this type relative movements occur between the axle and the body of the vehicle. As a result the pumping device contained in the suspension unit conveys fluid into the high-pressure chamber which carries the load of the vehicle. After the vehicle body reaches a certain predetermined level, the fluid flows again out of the high-pressure chamber through controlled channels. Even an overloaded vehicle will then be lifted to the predetermined level and the pressure in the high-pressure chambers of the suspension units may then reach such high values that these units might be damaged. Furthermore, the vehicle is then also endangered since an overload will not be noticeable as on a vehicle with conventional springs by a lowered vehicle body.

There are self-pumping, level-controlling, hydropneumatic suspension units already known in which the pump conveys the fluid into a special pressure container the pressure of which is limited by suitable means, for example, a pressure relief valve. When the vehicle is lowered below the predetermined level, fluid flows from this pressure container into the actual high-pressure chamber of the suspension unit which has no means for protecting it from an overload.

It is an object of the present invention to provide a self-pumping, hydropneumatic suspension unit in combination with a device which prevents the vehicle from being overloaded and therefore also prevents the results of such overloading or permits an overloaded condition of the vehicle to become visually evident.

For attaining this object, the invention provides that the high-pressure chamber of the suspension unit which is subjected to the load of the vehicle be equipped with a pressure relief valve which opens when the pressure in the high-pressure chamber reaches a certain predetermined value. According to a preferred embodiment of the invention, this pressure relief valve terminates into the storage chamber of the suspension unit and is provided with retarding means. The purpose of these retarding means is to insure that the pressure relief valve will act only when an overload condition continues to exit for a greater length of time, while at the occurrence of a short dynamic overload as caused, for example, by a bumpy road, it will remain inoperative. According to another preferred embodiment of the invention, the pressure relief valve terminates into the pump chamber of the suspension unit. This has the advantage that at the occurrence of a quasi-static overload, for example, when driving along a longer curve, no fluid can flow out of the high-pressure chamber and that therefore the vehicle body will not be lowered so as to cause an increased side-tilt angle during cornering.

The features and advantages of the present invention will become more clearly apparent from the following detailed description thereof which is to be read with reference to the accompanying drawings, in which FIGURE 1 shows a longitudinal section of a self-pumping hydropneumatic suspension unit which is provided with a pressure relief valve which terminates into the storage chamber of the suspension unit;

FIGURE 2 shows an enlarged longitudinal section of the pressure relief valve according to FIGURE 1 which is provided with retarding means; while FIGURE 3 shows a longitudinal section of a suspension unit according to a modification of the invention which is provided with a pressure relief valve which terminates into the pump chamber.

Referring first particularly to FIGURE 1 of the drawings, the suspension unit according to the invention has a housing 1 which has a connecting stud 2 secured to its bottom and a cover 4 for closing its open end by means of a screwed-on locking ring 3. Cover 4 has a central bore through which the piston rod 5 of the main piston 6 extends to the outside. Piston rod 5 is slidable along this bore, and the wall of this bore is provided with sealing rings 7 for sealing the pump chamber 22 toward the outside. On its outer end, piston rod 5 has a connecting eye 8. Piston 6 is slidable within a cylinder 9 which is clamped between the cover 4 and a bottom plate 10. Housing 1 and cylinder 9 together form the storage chamber 11 which is filled with gas above the fluid level 12. A tubular diaphragm 14 is clamped at one end between the wall of housing 1 and the bottom plate 10 and at its other end between the same wall and a partition 13. This diaphragm 14 separates the gas cushion 15 from the high-pressure chamber 16 which is filled with fluid and communicates through channels 17 with the recess 18 in the bottom plate 10. The gas for forming gas cushion 15 enters the housing 1 through gas inlet opening 1a. The opening is subsequently suitably closed by means not shown. Throttling channels 19 and/or throttle valves 20, which serve in a conventional manner for suppressing vibrations, connect the recess with the cylinder chamber 21 of the suspension unit which is separated by the main piston 6 from the pump chamber 22. This pump chamber communicates through the suction valve 23 with the storage chamber 11 and through the pressure valve 24 with the cylinder chamber 21.

A control port 26 in the wall of cylinder 9, which is controlled by the control edge 27 of the working piston 6, connects the cylinder chamber 21 with the storage chamber 11 when the piston is in the appropriate position. The partition 13 supports a pressure relief valve 25 which is illustrated in detail in FIGURE 2. This valve 25 is provided with a differential piston member 28 which is provided with the two pistons 29 and 30 which are connected by an intermediate member 31. Cylinder 32 containing piston 29 has a shoulder with a sealing gasket 34 thereon engaging the partition 13 and terminates into a neck portion 33 which extends through a bore in the partition 13 and is riveted to the latter. Cylinder 35 containing piston 30 is screwed together with the cylinder 32. The differential piston 28 is acted upon by a spring 36 the tension of which is adjustable by means of a threaded sleeve 37. The end surface of cylinder 32 forms a valve seat 45 on which the intermediate member 31 forming a valve member is adapted to engage.

In the operation of the suspension unit, fluid is pumped from the storage chamber 11 into the cylinder chamber 21, whereby the distance between the connecting stud 2 and the connecting eye 8 increases until the control edge 27 of main piston 6 uncovers the control port 26 and thus permits the fluid to pass back from the cylinder chamber 21 into the storage chamber 11. If the pressure in the high-pressure chamber 16 increases beyond a certain value which is determined by the spring 36, valve 45 is opened by the fluid passing between piston 29 and cylinder 32. The fluid then passes into cylinder 35 and, if the high pressure continues, it shifts the piston 30 so far until the control edges 40 and 41 uncover the passage into the storage chamber 11. The throttling gap 42 between the piston rod 43 of piston 29 and the wall of cylinder 30 and also the throttling gap 44 between the intermediate member 31 and the wall of cylinder 30 cause a delayed opening of the control edge 41. The pressure relief valve therefore becomes effective only if an overload lasts for a greater length of time and does not act at all if only a short dynamic overload occurs. At a normal operating pressure, the valve member 31 engages with the valve seat 45 and prevents a leakage of fluid from the high-pressure chamber 16.

In the modification of the invention according to FIGURE 3, the housing 301 of the suspension unit has a bottom which is provided with a connecting stud 302, while its other end 303 is closed by being flanged over the cover 304. This cover 304 has a central bore through which the piston rod 305 of the main piston 306 extends to the outside relative to which the piston rod 305 is sealed by a sealing ring 307. Piston rod 305 is hollow and closed at its outer end by another connecting stud 308. The cylinder 309 is secured between the cover 304 and a bottom plate 310. A tubular diaphragm 314 is clamped at one side against the wall of housing 301 and at the other side against the bottom plate 310, the partition 313, and the cover 304. Above the partition 313, diaphragm 314 separates the gas cushion 315 from the high-pressure chamber 316, while underneath the partition 313, diaphragm 314 separates a further gas cushion 351 from the low-pressure chamber 311. Ports 317 lead from the high-pressure chamber 316 into a recess 318 in the bottom of housing 301. Throttle valves 320 connect the recess 318 with the cylinder chamber 321. The low-pressure chamber 311 is connected with the annular chamber 353 through the channels 352. The inside of piston 305 forms a pump chamber 354 in which the pump piston 355 is slidable which is connected to the bottom plate 310 by a gimbal suspension. Pump chamber 354 is connected through a suction valve 323 with the annular chamber 353 and through the pressure valve 324 with the cylinder chamber 321. A longitudinal channel 356 of pump piston 355 terminates into the recess 318 in the bottom of housing 301. Opposite to the pump chamber 354, the longitudinal channel 356 is closed by the spring-loaded valve 357 the opening pressure of which is adjustable by means of a set screw 358.

In the operation of this suspension unit, the relative movements occurring between the pump chamber 354 and the pump piston 355 causes fluid to be pumped from the annular chamber 353 into the cylinder chamber 321. As soon as the control edge 327 of the main piston 306 uncovers the control port 326 in the wall of cylinder 306, the fluid which has been pumped into cylinder chamber 321 flows back into the low-pressure chamber 311. The position in which the main piston 306 is then located relative to the housing 301 determines the level of the vehicle. If, for example, due to a static or quasi-static overload the pressure in cylinder chamber 321 exceeds the opening pressure of valve 357, it is possible for fluid to flow back from the cylinder chamber 321 into the pump chamber 354. A further increase in pressure in cylinder chamber 321 is therefore impossible. The pressure relief valve 357 will be operative also when the overflow port 326 is not as yet uncovered. A statically overloaded vehicle will therefore not reach the predetermined level so that the fact that the vehicle is overloaded will be visually noticeable. If a quasi-static overload occurs, for example, when the vehicle is driven along a long curve, no loss of fluid from cylinder chamber 321 will occur since the pump chamber 354 into which the pressure relief valve terminates is closed by the suction valve 323 relative to the low-pressure chamber 311. An increased side-tilt angle of the vehicle during cornering will therefore be avoided and the vehicle will straighten up immediately after the quasi-static overload is terminated.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. In a hydropneumatic suspension device of the self-pumping type for motor vehicles comprising: a cylinder providing a cylinder chamber and a pump chamber located remote from said cylinder chamber; a piston reciprocably disposed within said cylinder and in working relationship to said cylinder and pump chambers; a housing axially extending forming an outer chamber around said cylinder; an annular partition member disposed in said last mentioned chamber transversely between said housing and said cylinder for establishing a sealingly disconnected first and second portion within said housing, said first portion providing a high pressure chamber and said second portion providing a fluid reservoir; a flexible partition coaxially disposed relative to said cylinder dividing said first portion into two compartments, one of which is filled with gas under relatively high pressure and the other with a hydraulic medium; means for establishing and controlling fluid intercourse between the compartment containing the hydraulic medium and the cylinder chamber; means for establishing and controlling fluid intercourse between the fluid reservoir of said second portion and said pump chamber; and a pressure relief valve operably secured to said annular partition member for establishing fluid communication from said high pressure chamber directly to said fluid reservoir when the fluid pressure in said high pressure chamber exceeds a predetermined value.

2. A suspension device according to claim 1, wherein said pressure relief valve comprises a fluid pressure responsive differential piston including a piston rod arranged substantially coaxially relative to the longitudinal axis of the cylinder and said partition member has an opening adjacent to and between said portions with said valve piston rod extending into said opening.

3. A suspension device according to claim 2, wherein a throttling gap is provided between said rod and said partition member.

4. In a hydropneumatic suspension unit of the self-pumping type for motor vehicles comprising: a cylinder providing a cylinder chamber and a pump chamber located remote from said former chamber; piston means reciprocably disposed within said cylinder and in working relationship to said chamber; a housing axially extending forming a high pressure chamber around said cylinder; and a pressure relief valve secured to said piston means operably disposed for direct and positive action between said high pressure chamber and said pump chamber to establish discharge directly into said pump chamber in response to a predetermined level of fluid pressure in said high pressure chamber.

5. In a hydropneumatic suspension device of the self-pumping type for motor vehicles comprising: a cylinder providing a cylinder chamber; a tubular piston rod member within said cylinder; a pump piston member slidably disposed within the tubular piston rod forming a pump chamber between said members remote from but in working relationship to said cylinder chamber; a housing axially extending forming a high pressure chamber around said cylinder; and a pressure relief valve secured to said pump piston member having an inlet and an outlet opening, said inlet opening being in direct fluid contact with said high pressure chamber and the outlet opening thereof being disposed for discharging fluid directly into said pump chamber and response to a predetermined fluid pressure in said high pressure chamber.

6. A hydropneumatic suspension unit of the self-pumping type for motor vehicles having means for controlling the working pressure, comprising: means providing a high pressure chamber acted upon by the weight of the vehicle, and a pump chamber; a piston, reciprocably disposed in said pump chamber, having a channel terminating into said pump chamber and communicating with said high pressure chamber; a pressure relief valve mounted in said channel to establish fluid communication between said high pressure chamber and said pump chamber when the fluid in said high pressure chamber exceeds a predetermined value.

References Cited by the Examiner

UNITED STATES PATENTS

| | | | |
|---|---|---|---|
| 1,071,446 | 8/1913 | Liebau | 267—64 |
| 2,443,615 | 6/1948 | Gruss | 267—64 |
| 2,744,386 | 5/1956 | Gerwig | 251—118 X |
| 2,802,664 | 8/1957 | Jackson. | |
| 2,987,310 | 6/1961 | Ord. | |
| 3,033,556 | 5/1962 | Wossner. | |
| 3,041,062 | 6/1962 | Bliven | 267—64 |
| 3,082,788 | 4/1963 | Quayle | 251—118 X |

FOREIGN PATENTS

| | | |
|---|---|---|
| 616,490 | 2/1961 | Italy. |
| 869,132 | 5/1961 | Great Britain. |

ARTHUR L. LA POINT, *Primary Examiner.*